March 26, 1929.  L. HAMPSON  1,706,881
FISHHOOK
Filed Feb. 4, 1928
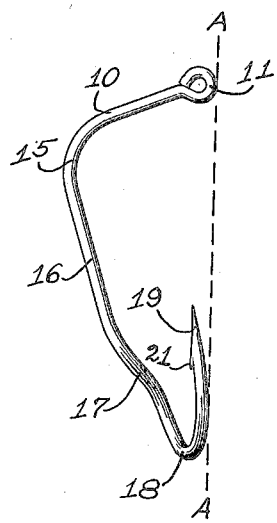
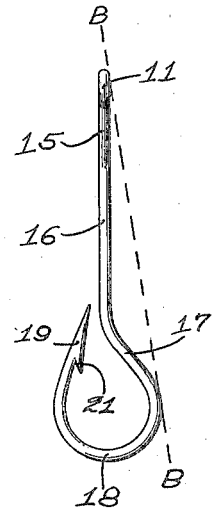
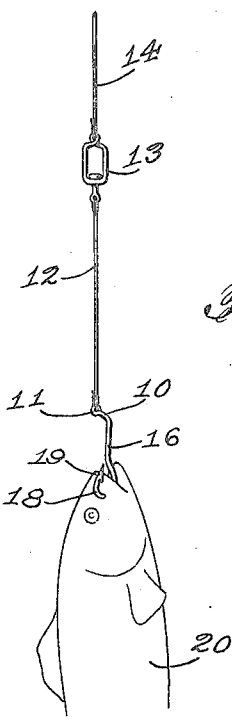
INVENTOR
Lewis Hampson
BY
H. G. Manning
ATTORNEY Patented Mar. 26, 1929.

1,706,881

UNITED STATES PATENT OFFICE.

LEWIS HAMPSON, OF MIAMI, FLORIDA.

FISHHOOK.

Application filed February 4, 1928. Serial No. 251,943.

This invention relates to fish hooks, and more particularly to an improved form of fish hook shaped in such a manner as to enable the angler to catch a high percentage of the fish that strike at the bait.

One object of this invention is to provide a fish hook of the above nature having an L-shaped shank, the upper portion thereof being substantially horizontal, whereby it will be adapted to prevent the hook from being swallowed and also adapted to prevent the bait from sliding up over the upper end of the hook.

A further object is to provide a fish hook having a lower curved point section disposed substantially perpendicular to the plane of the upper L-shaped portion of the shank.

A further object is to provide a fish hook in which the fish-penetrating prong is bent inwardly so that it will not be likely to become snagged by catching in weeds or rocks.

A further object is to provide a fish hook which will enable the bait to be held securely until the fish is caught, and from which the fish may be easily unhooked by a simple twisting motion.

A further object is to provide a fish hook which is adapted to penetrate the upper or lower lip or tough portion of the mouth of the fish instead of the gills or soft tissues, so that it will be difficult for the fish to break away, and whereby the efforts of the fish to escape will serve to more deeply imbed the hook in its mouth.

A further object is to provide a fish hook shaped in such a manner that it will be practically impossible for the fish to "spit" it from its mouth.

A further object is to provide a hook of the above nature having a shock-absorbing spring portion located in its shank portion.

A further object is to provide a device of this nature which will be simple in construction, inexpensive to manufacture, easy to manipulate, ornamental in appearance, and very efficient and durable in use.

With these and other objects in view there has been illustrated on the accompanying drawings one form in which the invention may be conveniently embodied in practice.

Fig. 1 represents front view of the fish hook taken from a direction perpendicular to the plane of the L-shaped shank, and parallel to the plane of the curved point end of said hook.

Fig. 2 is a side view of the fish hook taken from a direction parallel to the L-shaped shank, and substantially perpendicular to the plane of the point end of the hook.

Fig. 3 is a perspective view of the fish hook on a reduced scale, as it appears when attached to the snood and having a fish suspended therefrom.

Referring now to the drawings in which like reference numerals denote corresponding parts throughout the several views, the numeral 10 indicates an upper substantially horizontal shank portion terminating in an eye 11. The eye 11 is adapted to be attached to a snood 12, said snood being connected at its upper end to a swivel member 13 which in turn is joined to a leader 14 connected at its upper end to a suitable sinker, not shown.

The shank portion 10 is joined by means of a curved spring section 15 to a substantially vertical shank portion 16, said spring section 15 serving the function of a shock-absorber for sudden jerks and pulls of the fish, and thereby preventing flattening or permanent deformation of the hook.

The shank portion 16 is connected with a lower shank portion 17 which lies in a plane substantially perpendicular to the plane of the L-shaped upper portion of the shank, and is inclined at about 150 degrees to the shank portion 16. The inclined shank portion 17 is joined at its lower end to a substantially semi-circular point section having a prong 19 for penetrating a fish 20, and a retaining barb 21 of the usual construction.

In order to cause the hook to be securely imbedded in the mouth of the fish and make it difficult for the fish to escape from the hook, the semi-circular point section 18 is disposed in a plane inclined at about 45 degrees to the lower shank portion 17 and substantially perpendicular to the plane of the L-shaped upper shank portion of the hook.

Moreover, in order to prevent the point of the fish hook from becoming snagged in weeds or rocks, the prong 19 is disposed well within the line marked A—A on Fig. 1 of the drawing, which connects the outer sections of the eye 11 and the curved point section 18. The prong 19 is also located well within the plane marked B—B on Fig. 2, which includes the horizontal shank portion 10 and is tangent to the inner end of the curved point section 18.

In using the improved fish hook, the angler will place as much bait on the hook as may be found desirable. When the fish strikes, its jaws will enclose the hook as far up as the shank 16. In its attempt to draw the bait away, the fish will slide down the shank 16 causing the prong 19 to penetrate either in the upper or lower lip or the corner of the mouth of the fish.

In most instances the prong 19 of the hook will pass entirely through the jaw of the fish, as clearly shown in Fig. 3, when the hook will have an appearance similar to the ring in a bull's nose.

In any case, it will be difficult for the fish to escape from the hook, and the angler can easily pull it in. The hook may then be readily removed from the mouth of the fish by giving the hook a three-quarter turn by a simple twist of the wrist.

One advantage of the present invention is that the line joining the prong 19 of the fish hook and the eye 11 lies substantially in line with the snood 12, so that the tension of the line will not tend to bend the point of the hook laterally as was the case in some former types of curved hooks.

A further advantage is that when the mouth of the fish in its effort to seize the bait strikes the horizontal shank portion 10 of the hook, the fish will instinctively close its jaws which will become very securely imbedded on the hook.

In practice it has been found that by using the present form of hook, a remarkable increase in the percentage of catches is possible as compared with the common form of hook. This is probably due in part to the fact that the present hook always penetrates the tough portion of the mouth of the fish, and only rarely catches in its gills or soft tissues.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a fish hook, an L-shaped upper shank portion having an eye for attachment to a line, and a curved lower point section lying in a plane disposed at about 90 degrees to the L-shaped upper shank portion, said point section having a fish-penetrating prong lying inside the line which passes through the eye and is tangent to the curved point section, whereby the prong will not often become snagged or entangled in weeds or rocks.

2. In a fish hook, an L-shaped shank consisting of a substantially horizontal upper extremity for attachment to a line and a vertical portion, a lower shank portion inclined to said vertical shank portion and lying in a plane substantially perpendicular to the plane of said L-shaped upper shank, a semi-circular point section connected to said lower inclined shank portion and disposed in a plane inclined at about 45 degrees to the lower shank portion and substantially perpendicular to the plane of said L-shaped upper shank.

3. In a fish hook, an upper substantially horizontal shank portion having an eye for attachment to a line, a shock-absorbing spring shank portion and a curved point section, the plane of said curved point section being substantially perpendicular to said upper horizontal shank portion.

4. In a fish hook, an L-shaped shank consisting of a substantially horizontal upper extremity for attachment to a line and a vertical portion, a lower inclined shank portion, a semi-circular point section connected to said lower inclined shank portion and disposed in a plane inclined at about 45 degrees to the lower shank portion and substantially perpendicular to the plane of said L-shaped upper shank.

5. In a fish hook, an L-shaped shank consisting of a substantially horizontal upper extremity for attachment to a line and a vertical portion, a lower shank portion inclined to said vertical shank portion and lying in a plane substantially perpendicular to the plane of said L-shaped upper shank, a semi-circular point section connected to said lower inclined shank portion and disposed in a plane inclined at about 45 degrees to the lower shank portion.

6. In a fish hook, an L-shaped shank consisting of a substantially horizontal upper extremity for attachment to a line, a vertical portion, a lower inclined shank portion, and a semi-circular point section connected to said lower inclined shank portion and disposed in a plane inclined at about 45 degrees to the lower shank portion.

7. In a fish hook, an L-shaped shank consisting of a substantially horizontal upper extremity for attachment to a line and a vertical portion, a lower shank portion inclined at about 150 degrees to said vertical shank portion and lying in a plane substantially perpendicularly to the plane of said L-shaped upper shank, and a semi-circular point section connected to said lower inclined shank portion and disposed in a plane inclined at about 45 degrees to the lower shank portion and substantially perpendicular to the plane of said L-shaped upper shank.

8. In a fish hook, an L-shaped shank consisting of a substantially horizontal upper extremity for attachment to a line, and a vertical portion, a lower shank portion inclined at about 150 degrees to said vertical shank portion and lying in a plane substantially perpendicular to the plane of said L-shaped upper shank, and a semi-circular point section connected to said lower inclined shank portion and disposed in a plane inclined to the lower shank portion and substantially perpendicular to the plane of said L-shaped upper shank.

In testimony whereof, I have affixed my signature to this specification.

LEWIS HAMPSON.